US012210513B1

(12) United States Patent
Obstfeld et al.

(10) Patent No.: US 12,210,513 B1
(45) Date of Patent: Jan. 28, 2025

(54) SYSTEMS AND METHODS FOR PROVIDING CONFIDENCE IN AN ORACLE (71) Applicant: Cisco Technology, Inc., San Jose, CA (US)

(72) Inventors: Joel A. Obstfeld, Hertfordshire (GB); Oliver James Bull, Bristol (GB); Louis Gwyn Samuel, Wiltshire (GB); Andrew Pletcher, Scotts Valley, CA (US); Marcelo Yannuzzi, Nuvilly (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/360,051

(22) Filed: Jul. 27, 2023

(51) Int. Cl.
G06F 16/00 (2019.01)
G06F 16/23 (2019.01)

(52) U.S. Cl.
CPC ...... G06F 16/2379 (2019.01); G06F 16/2365 (2019.01)

(58) Field of Classification Search
CPC .......................... G06F 16/2379; G06F 16/2365
See application file for complete search history.

(56) References Cited

U.S. PATENT DOCUMENTS 10,277,518 B1*  4/2019  Matthews ........... H04L 43/0852
10,855,475 B1   12/2020 Leach et al.
11,061,886 B2*  7/2021  Chepak, Jr. ........... G06F 16/168
11,405,180 B2*  8/2022  Cahill ................... H04L 9/3239
11,520,907 B1* 12/2022  Borowiec .............. G06F 3/067
12,079,333 B2*  9/2024  Karr ...................... G06F 3/0653
12,079,356 B2*  9/2024  Massiglia ........... G06F 21/6218
12,081,681 B2*  9/2024  Toll .......................... G06F 21/57
2016/0149769 A1   5/2016 Joshi et al.
2017/0048217 A1*  2/2017 Biggs ...................... H04L 51/04
2018/0032383 A1*  2/2018 Surcouf ................ H04L 9/3239
2018/0130050 A1   5/2018 Taylor et al.
(Continued)

FOREIGN PATENT DOCUMENTS

WO    2022267184 A1    12/2022

OTHER PUBLICATIONS

Middleware, "Web3 observability: How to monitor Web3 applications," https://middleware.io/blog/web3-observability/, Dec. 6, 2022, 22 pages.
(Continued)

Primary Examiner — Noosha Arjomandi
(74) Attorney, Agent, or Firm — Edell, Shapiro & Finnan, LLC (57) ABSTRACT Presented herein are techniques for verifying data. A method can include obtaining, from an oracle, a first data set associated with a distributed ledger. The method further includes obtaining a plurality of data sets from a plurality of sources. The method further includes generating a confidence level regarding the first data set for validating the first data set, based on comparing the first data set to the plurality of data sets. The method further includes storing the first data set in the distributed ledger based on the confidence level indicating that the plurality of data sets concurs with the first data set. The method further includes taking a remedial action without storing the first data set in the distributed ledger based on the confidence level indicating a discrepancy between the plurality of data sets and the first data set.

20 Claims, 5 Drawing Sheets

(56) References Cited

U.S. PATENT DOCUMENTS

| | | | |
|---|---|---|---|
| 2019/0065593 A1 | 2/2019 | Barski | |
| 2019/0220836 A1* | 7/2019 | Caldwell | H04L 9/50 |
| 2019/0342084 A1 | 11/2019 | Mehedy et al. | |
| 2020/0076828 A1* | 3/2020 | Nainar | H04L 9/3263 |
| 2020/0159946 A1* | 5/2020 | Castinado | H04L 63/08 |
| 2020/0396302 A1 | 12/2020 | Le et al. | |
| 2021/0194700 A1 | 6/2021 | Moy et al. | |
| 2021/0211414 A1 | 7/2021 | Cage et al. | |
| 2021/0312088 A1 | 10/2021 | Choi | |
| 2022/0188829 A1* | 6/2022 | Pioli Moro | H04L 67/1095 |
| 2022/0217113 A1 | 7/2022 | Khan et al. | |
| 2023/0102162 A1* | 3/2023 | Santana De Oliveira | G06F 16/2365 707/690 |
| 2023/0169062 A1* | 6/2023 | Htay | G06F 16/2365 705/44 |
| 2023/0224162 A1* | 7/2023 | Gallagher | H04L 9/3239 713/176 |
| 2023/0274244 A1* | 8/2023 | Quigley | G06F 21/602 705/65 |
| 2024/0194259 A1* | 6/2024 | Zhou | G06F 3/0616 |
| 2024/0261692 A1* | 8/2024 | Sliwka | H04L 9/3213 |
| 2024/0296158 A1* | 9/2024 | Nakasaka | G06F 16/2379 |

OTHER PUBLICATIONS

McBride, M., et al., "BGP Blockchain," Workgroup: Network Working Group, Internet-Draft: draft-mcbride-rtgwg-bgp-blockchain-02, https://datatracker.ietf.org/doc/draft-mcbride-rtgwg-bgp-blockchain/, Mar. 6, 2023, 13 pages.

Connext Labs, "Welcome to the Connext Docs," https://docs.connext.network/, May 5, 2023, 3 pages.

Layer Zero, "Seamlessly Connected Blockchains," retrieved from https://layerzero.network, May 5, 2023, 4 pages.

Trossen, D., et al., Industry IoT Consortium, "Impact of Distributed Ledgers on Provider Networks," An Industry IoT Consortium Whitepaper, iiconsortium.org, Jan. 10, 2022, 20 pages.

Preethi Kasireddy, "The Architecture of a Web 3.0 application," https://www.preethikasireddy.com/post/the-architecture-of-a-web-3-0-application, Sep. 22, 2021, 31 pages.

Cloudflare, "Your Gateway to Web3," Easy access to IPFS and Ethereum networks, retrieved from https://www.cloudflare.com/application-services/products/web3/ on Jul. 26, 2023, 9 pages.

Metamask, "A crypto wallet & gateway to blockchainapps," retrieved from https://metamask.io/, on Jul. 26, 2023, 10 pages.

Tenderly, "Enabling Web3 developers to build, test, monitor, and operate smart contracts from their inception to mass adoption.," Ethereum Development Platform, retrieved from https://tenderly.co/, Jul. 26, 2023, 10 pages.

Settlemint, "Blockchain Made Easy.," retrieved from https://www.settlemint.com/, on Jul. 26, 2023, 26 pages.

Kaleido, "Your Web3 Platform for Blockchain & Digital Assets," Enterprise-Grade Blockchain & Digital Asset Platform, retrieved from https://www.kaleido.io/, on Jul. 26, 2023, 9 pages.

Wang, Q., et al., "Exploring Web3 From the View of Blockchain," (Tech Report), https://www.researchgate.net/publication/361416088_Exploring_Web3_From_the_View_of_Blockchain, Jun. 17, 2022, 38 pages.

Alchemy, "Decentralized Oracles," List of 15 Decentralized Oracles, retrieved from https://www.alchemy.com/best/decentralized-oracles, Jul. 26, 2023, 8 pages.

* cited by examiner

SYSTEMS AND METHODS FOR PROVIDING CONFIDENCE IN AN ORACLE

TECHNICAL FIELD

The present disclosure relates to systems and methods for verifying data to provide confidence in an oracle associated with a distributed ledger.

BACKGROUND

Blockchain systems have been proposed for a variety of application scenarios, including applications in the financial industry, health care, Internet of Things (IoT), and so forth. With the development of new technologies, distributed ledger platforms and systems, such as blockchains, are useful for storing data in an immutable and attestable manner. For example, users of cryptocurrency can utilize a distributed ledger system to keep track of transactions by storing such transaction data across a network of disparate computing systems that are not under the central command of a single server and/or authority. Without a central command server and/or authority, the computing systems operating within the network can be considered trustless in the sense that the computing systems are acting independently. To ensure the consistency of the data across the distributed ledger system network, computing systems operating within the distributed ledger system network will utilize a shared consensus mechanism.

DESCRIPTION OF EXAMPLE EMBODIMENTS

Overview

Presented herein are techniques for verifying data. According to one aspect a computer-implemented method involves obtaining, from an oracle, a first data set related to a first smart contract associated with a distributed ledger. The method further involves obtaining a plurality of data sets from a plurality of sources, wherein at least one of the plurality of sources is an out-of-band source. The method further involves generating a confidence level of the first data set for validating the first data set, based on comparing the first data set to the plurality of data sets. The method further involves storing the first data set in the distributed ledger based on the confidence level indicating that the plurality of data sets concurs with the first data set. The method further involves performing a remedial action without storing the first data set in the distributed ledger based on the confidence level indicating a discrepancy between the plurality of data sets and the first data set.

Example Embodiments

An oracle is an independent entity or service that can interface with a distributed ledger, such as a blockchain. Oracles can be considered as a gateway between a distributed ledger and the rest of the world. For example, a smart contract or decentralized application may obtain data as input including: a price of a particular commodity or stock, a temperature reading, or a vehicle identification number. The oracle can provide the mechanism by which that data is provided to the smart contract and ultimately written to the distributed ledger.

An underlying assumption may be made that the data obtained by the oracle from outside data sources can be relied upon meaning that the integrity of the data can be guaranteed. This assumption can be a weakness in these types of systems. Oracles can be a vital component in these types of systems and given the pivotal nature of an oracles, oracles can be potentially subject to exploitation. Threat actors may look to target the data being supplied to the oracle. If the data is compromised, the smart contract may execute on false assumptions or false data, when in reality the criteria for the smart contract to execute may not have been met.

The solutions presented herein introduce a verifier to a system with a smart contract and a distributed ledger that relies upon an oracle to obtain data. Instead of assuming that the data obtained by an oracle can be trusted, an assumption is made that data provided by an oracle could be compromised, and therefore, cannot be trusted until verified as being accurate. Before consuming the data obtained by an oracle at a smart contract and a distributed ledger, a validation process can be performed combining a random selection of local and remote trusted verifiers. This technique can be referred to as a side-channel verification and can generate and maintain trust in the data from the oracle before it is provided to a smart contract.

A data set can be provided to the oracle from a data source. The verifier can then query at random, a subset of the trusted verifiers. Each of the subsets of trusted verifiers can obtain data from a separate data source. If the same data is returned from the verifiers as the data that was provided to the oracle, then confidence is increased that the data provided to the oracle is valid or true. If some or all of the trusted verifiers report a result which is at conflict with the data provided to the oracle, then the system has a strong signal that corrupt or false data is being provided or that some form of compromise has taken place, enabling remedial action to be taken. In one or more example embodiments, data is validated before the smart contract receives data from the oracle and/or before the data is written to the distributed ledger.

Smart contracts can be described as computer programs that are intended to automatically execute, control, or document relevant events and actions according to the terms of a contract or an agreement. The contract can be expressed as 'code'—including if/then statements, functions, and other programming that automates the actions specified in a contract. A distributed ledger can support smart contract capabilities by enabling the smart contract's state machine to read from, and store state to, the distributed ledger. Smart contracts can be short-lived, performing a particular action and subsequently becoming redundant. They may also be long-lived, operating repeatedly in reaction to calls being made to the smart contract code.

Smart contracts can execute in a Web3 environment. The term "Web3" denotes a collection of technologies and network models that collectively provide a decentralized approach in contrast to the prevailing centralized model of systems and solutions. In a centralized model, services are provided at the discretion of a single administrative entity. Conversely, in a decentralized model, services are delivered through the collaborative efforts of various administrative entities without a singular point of ownership or control. The primary objective of Web3 is to facilitate the creation of services composed of logical infrastructure offered by diverse administrative entities.

In such an environment, a set of technologies is used to establish trust and assurance concerning the operation and execution of services. This entails fostering trust and assurance among administrative entities offering logical infrastructure, as well as ensuring trust and assurance for the users of the resulting services. This set of technologies may encompass distributed ledgers, consensus mechanisms, payment methods for service exchanges, decentralized protocols, and smart contracts. These technologies work in tandem to enable the development of applications and services.

In a Web3 paradigm, a smart contract can execute using distributed ledger technology (DLT). DLT may be an append-only distributed data structure that includes authenticity and integrity features in which updates (inserts) be accepted via a consensus mechanism among validators. Validators may refer to blockchain contribution nodes that run a block consensus protocol. Blockchains refer to a type of DLT wherein the underlying data structure includes a hash chain of blocks of data. Contribution nodes are a component of a distributed ledger that provide compute, storage, and/or bandwidth services for running a DLT, blockchain, or other decentralized service. In DLT, contribution tokens may be a unit of value bound to the action of contributing to a peer-to-peer network running the DLT or blockchain; value tokens may store value and can be traded as assets. In the context of Web3, a smart contract may include a computer program that is configured to automatically execute, control, or document relevant events and actions according to the terms of a contract or agreement. A DLT may implement smart contracts by including a state machine that can be updated via DLT updates. A DLT may interface with one or more oracles, which are independent entities that provide information into and/or out of the ledger from an external source or sources. A distributed application (dApp) may run on a blockchain using a DLT to store state, and can utilize smart contract technology. Thus, a dApp is distributed in the sense that a dApp does not use a single central server as a service core.

Figure 1:
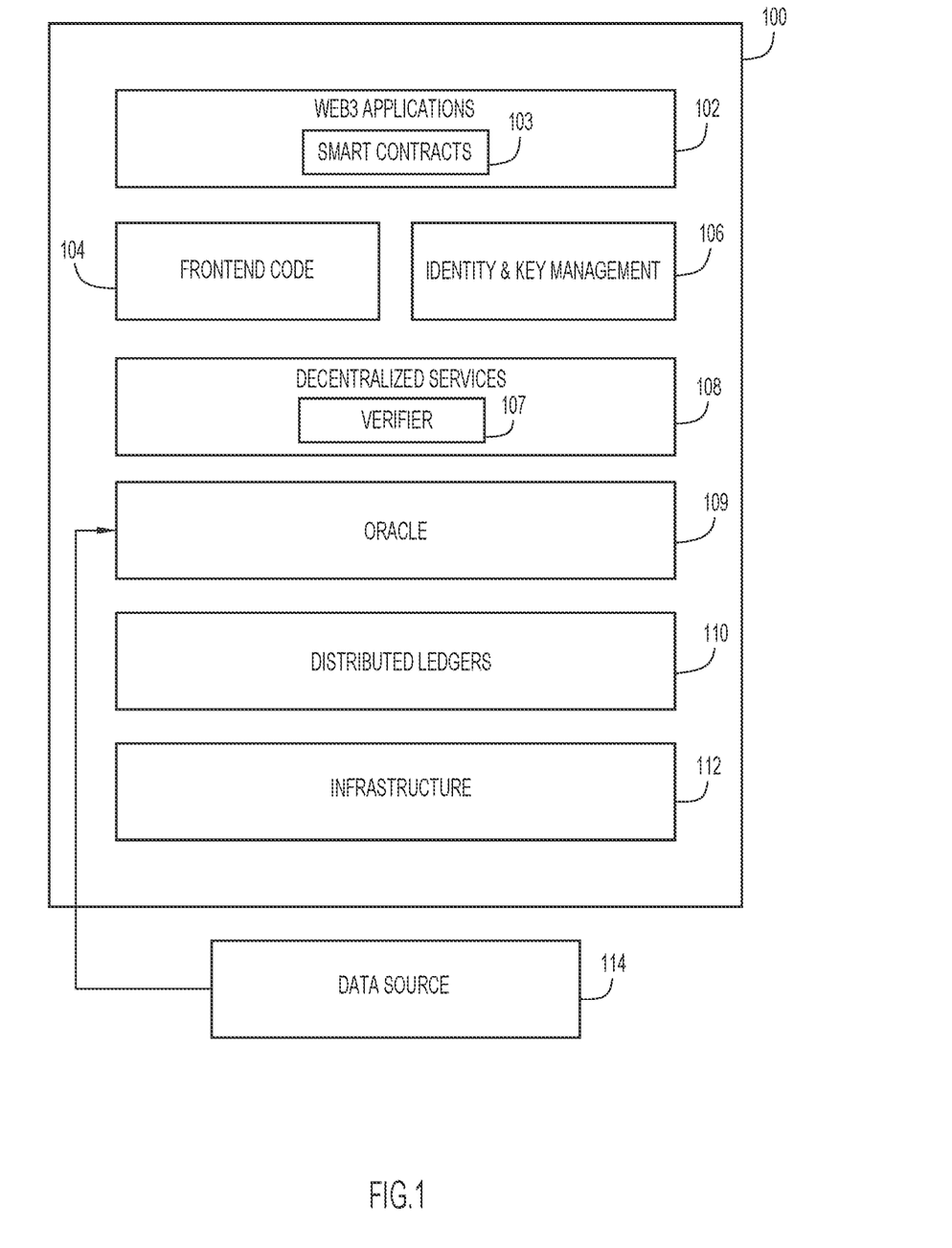
FIG. 1 is a block diagram of a Web3 model for utilizing, supporting, and/or providing Web3 services, according to an example embodiment.

Embodiments will now be described in detail with reference to the Figures. Reference is now made to FIG. 1. FIG. 1 is a block diagram of a Web3 model 100 utilizing, supporting, and/or providing Web3 services while also interacting with a verifier 107, according to an example embodiment.

Web3 model 100 has various layers, including Web3 applications 102, smart contracts 103, a frontend code 104, an identity and key management 106, a verifier 107 that is part of a decentralized services 108, an oracle 109, a distributed ledger 110, and an infrastructure 112. A data source 114 can be located outside of the Web3 model 100. It should be appreciated that these layers are examples that are provided for the sake of clarity, and may not indicate any particular network topology. The Web3 model 100 can provide Web3 services some of which may interact with the verifier 107 for obtaining data from outside of the Web3 model 100. The verifier 107 can provide the data to the smart contracts 103 which in turn provide the data to the distributed ledger 110. In one example, the distributed ledger 110 can obtain data from the verifier 107. The verifier 107 can receive data from the oracle 109 that receives data from the data source 114. The data source 114 can be outside of the network used by the Web3 model 100. The verifier 107 can verify the data from the oracle by comparing the data to data obtained from other data sources. The verifier 107 can generate a trust score related to the data after comparing the data to the data obtained from other data sources. If the trust score is low or below a certain threshold, then the data may not be provided to the smart contracts 103 and the distributed ledger 110. If the trust score is high, then the data can be provided to the smart contracts 103 and the distributed ledger 110.

Web3 applications 102 may include one or more Web3 services that provide utility to end-users. These Web3 services may encompass a wide range of user experiences, use cases, and applications that leverage the benefits of decentralized technologies, and may not be limited to strictly Web3 environments. Some of the prominent use cases and applications may include the smart contracts 103, single or multi-player games, virtual meeting environments, online collaboration tools, social media platforms, collectibles, augmented reality applications, virtual reality applications, cryptocurrency platforms, and the like. It is important to note that while these experiences and use cases can be facilitated by Web3 technologies, they are not exclusively dependent on Web3 and can be implemented in other contexts as well.

Frontend code layer for Web3 applications 102 may refer to the application code that runs on client devices, enabling the user interface and interaction with decentralized services 108. This code can use various languages, such as JavaScript®, Hypertext Markup Language (HTML), and/or Cascading Style Sheets (CSS). Frontend code 104 can provide the functionality to interact with decentralized networks, access smart contracts, and handle user interactions. Frontend code 104 may include frameworks and libraries that can be utilized to build scalable and modular Web3 front-end applications (e.g., Web3 applications of Web3 application layer). In some embodiments, the frontend code 104 provides the structure and content of Web pages, such as user interface elements, including text, buttons, forms, and containers. Frontend code 104 can be configured to provide any desired colors, fonts, layouts, and/or other visual properties of a user interface. Thus, frontend code 104 may enable the creation of dynamic and interactive user interfaces, facilitating the integration of decentralized functionality, and providing the particular user experience when interacting with Web3 services on client devices.

Identity and key management 106 provides an infrastructure for managing user identities, cryptographic keys, accounts, certificates, and signing operations within decentralized applications. Identity and key management 106 may ensure secure and reliable authentication, authorization, and cryptographic operations. In some embodiments, identity and key management 106 manages wallets, which are software applications that enable users to securely store and manage their cryptographic keys. These wallets typically employ strong encryption techniques to safeguard private keys and provide convenient interfaces for users to interact with their accounts and assets on decentralized networks. Identity and key management 106 may manage cryptographic keys, which are used for various purposes, including identity verification, digital signatures, encryption, and/or access control. Web3 identity systems often utilize public-key cryptography, where users possess a private key for signing transactions or providing proof of identity, and a corresponding public key for verification purposes. In some embodiments, identity and key management 106 manages Web3 accounts that are associated with specific identities or entities on decentralized networks. The accounts can be linked to cryptographic key pairs and may serve as the primary mechanism of interaction and ownership within the Web3 ecosystem. Accounts enable users to access and manage their assets, interact with smart contracts, and participate in network activities. Identity and key management 106 may manage certificates for enhancing trust and security. Certificates can serve as digital credentials that bind a user's identity to their cryptographic keys, enabling verification and validation of identities in decentralized environments. Certificates can be issued by trusted authorities or implemented through decentralized identity frameworks. In some embodiments, identity and key management 106 performs signing operations, which may involve using cryptographic keys to generate digital signatures. In Web3 environments, signing is used to ensure data integrity, non-repudiation, and/or secure transactions. By signing messages or transactions with their private keys, users can prove ownership and provide cryptographic proof of authenticity and integrity.

Decentralized services 108 includes multiple disparate entities collaborating to offer various services. These services may include distributed document storage, tokenization, proof-of-existence, distributed computation-as-a-service, distributed communications-as-a-service, distributed ledger indexing and querying, and/or payment and exchange of value. Distributed document storage enables decentralized storage of files across a network of nodes, ensuring data availability and resilience. Tokenization represents real-world assets or rights as digital tokens, enabling fractional ownership and transferability. Proof-of-existence allows users to prove the integrity and timestamped existence of digital assets. Distributed computation-as-a-service may employ collective computational power for complex tasks, whereas distributed communications-as-a-service may facilitate secure and private communication without centralized intermediaries. Distributed ledger indexing and querying can provide access to data on distributed ledgers. Payment and exchange systems enable decentralized transactions using blockchain technology.

The oracle 109 can be a layer that is part of the Web3 model 100 that is able to access data from outside of the world or network of the blockchain. In one form, the oracle provides for accessing data from a world outside a blockchain by the distributed ledger 110 that interact with the oracle. The oracle may obtain data from the outside world (external to the distributed ledger 110) and put it or write it into a blockchain for other smart contracts to consume. The oracle may be capable of receiving data from the data source 114. The oracle can send or receive data from locations outside of the world or network of the blockchain. Receiving data from outside of the world or network of the blockchain can be described as out-of-band communications. The out-of-band communications can be using networks and network protocols other than those used between a smart contract and a distributed ledger. The out-of-band communications can be over the internet, a data network, a cellular network, or a local access network.

Distributed ledger 110 may employ one or more distributed ledgers that include various components and mechanisms to establish trust and assurance between entities in a decentralized environment. Distributed ledger 110 may include distributed ledger technologies, consensus mechanisms, layer 1 and layer 2 ledgers, rollups, zero-knowledge proofs, sharding, smart contract code, smart contract execution engines, contribution nodes, validator nodes, peer-to-peer (P2P) communications protocols, contribution tokens, and oracles. Distributed ledger technologies enable the decentralized storage and management of data across a network of nodes, and consensus mechanisms ensure agreement on the state of the ledger among participating nodes. Layer 1 features utilize methods such as changing the consensus mechanism, forking the chain, and sharding. In contrast, layer 2 services include state channels, nested blockchains, rollups, and sidechains. Rollups may aggregate and process transactions off-chain before committing the transactions to the main chain. Zero-knowledge proofs enable privacy-preserving and verifiable computations. Sharding elements partition the network into smaller groups, enhancing scalability. Smart contract code represents self-executing agreements on the ledger, while smart contract execution engines handle the processing and validation of these contracts. Distributed ledger 110 may include contribution nodes and validator nodes that maintain and secure the network. In some embodiments, peer to peer (P2P) communications protocols facilitate decentralized communication between nodes. Distributed ledger 110 utilizes contribution tokens to incentivize participation and contribution within the network. In some embodiments, distributed ledger 110 includes one or more oracles to provide external data and real-world information to smart contracts or other distributed applications.

Infrastructure 112 may include a set of components that form the hardware and/or software that supports decentralized services 108 and models, which may be substantially similar to those found in centralized systems. Infrastructure 112 can include compute resources, network infrastructure, telecommunications capabilities, bandwidth availability, processing capacity, hosting services, access mechanisms, security measures, and software frameworks. Compute resources may include the hardware and software for data processing and storage such as processor(s), microprocessor(s) and memory. Network infrastructure enables the connectivity and communication between nodes in the decentralized network, and other telecommunication elements may be responsible for the exchange of data and information across different network endpoints. Hosting services can support the deployment and management of decentralized applications and services. Access mechanisms may be provided to enable users to interact with the decentralized infrastructure of various components of Web3 model 100 and its various services. Security measures may be provided to protect data, privacy, and network integrity. Software frameworks may provide the tools and libraries for developing and running Web3 applications in Web3 application layer.

Figure 2:
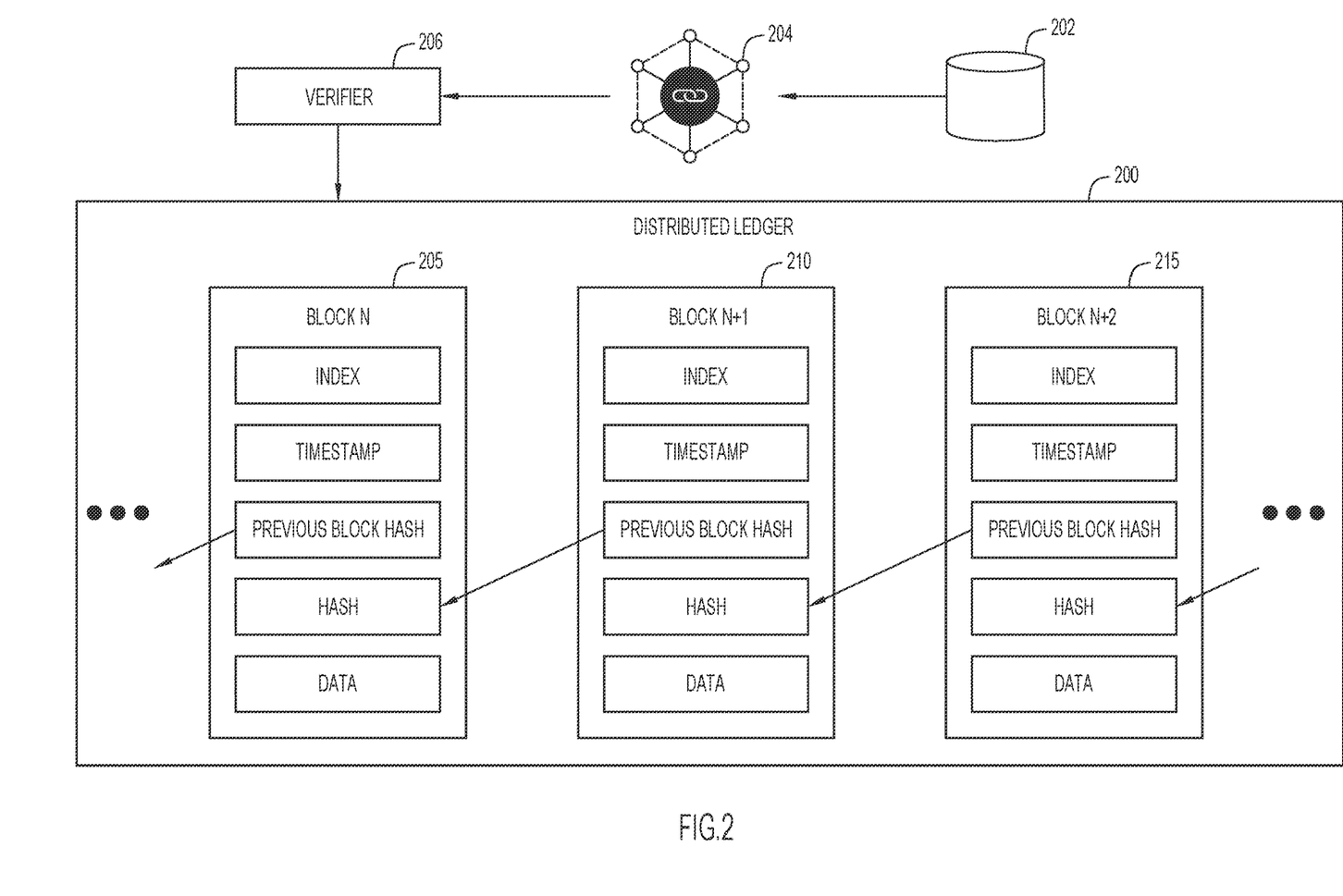
FIG. 2 is a block diagram depicting a distributed ledger for performing or supporting various operations in accordance with an embodiment of the present invention.

With reference now to FIG. 2, a block diagram is provided depicting a distributed ledger 200 for performing or supporting various operations in accordance with an example embodiment. The distributed ledger 200 can write data or information from a data source 202 to the distributed ledger 200 in blocks. The data from the data source 202 can be obtained by an oracle 204 and can pass through a verifier 206 before being written to the distributed ledger 200. As depicted, there are three blocks, block N (205), block N+1 (210), and block N+2 (215). It should be appreciated that this depiction of a distributed ledger 200 is only a portion of the ledger, and information can be stored as an entry in any block in distributed ledger 200. In some embodiments, distributed ledger 200 is a blockchain. Distributed ledger

200 may correspond to elements that are depicted and described with reference to distributed ledger 110 of FIG. 1.

Each block 205-215 may include an index, a timestamp, a previous block hash, a hash, and data. The index of a block includes an identifier for the block, such as a unique key. The timestamp of a block may indicate when the block was created, validated, and/or last modified. The previous block hash contains a hash of information in the previous block, which in turn capture, via their own hash, information in the next preceding block, ensuring that data recorded in distributed ledger 200 is immutable. In some embodiments, each hash may be a cryptographic hash, and may include a hash of the data stored in its block as well as the data corresponding to the previous block's hash. Thus, once recorded, the data in any given block cannot be altered retroactively without alteration of all subsequent blocks, which involves consensus of the network majority. The data can include any desired data, such as a transaction record, video data, text data, audio data, time-series data, encrypted data, data and corresponding metadata, and the like.

Figure 3:
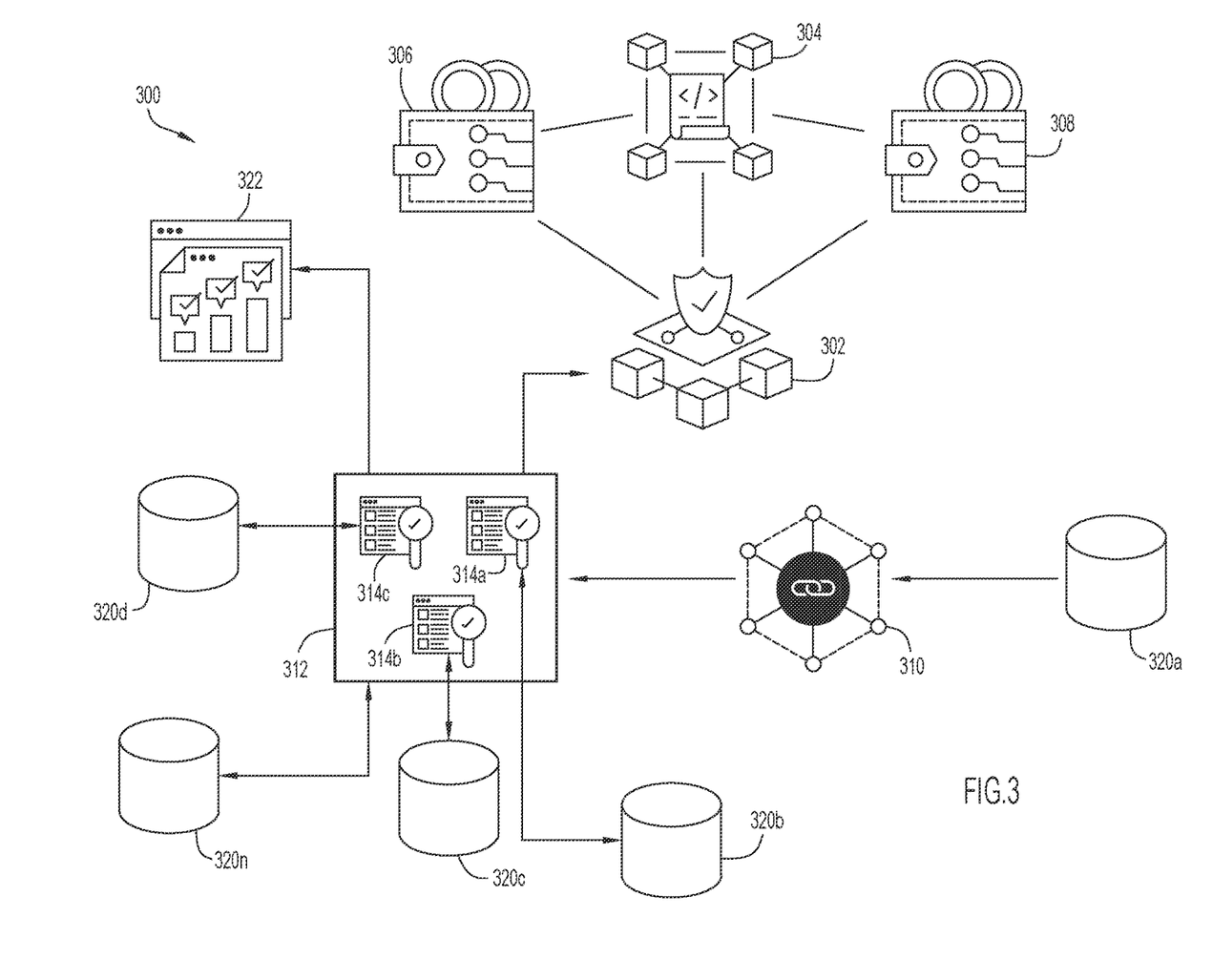
FIG. 3 is a block diagram of a system for verifying data, according to an example embodiment.

FIG. 3 shows a system 300 that verifies data from an oracle prior to storing in a ledger according to an example embodiment. The system 300 includes a distributed ledger 302, a smart contract 304, a first digital wallet 306, a second digital wallet 308, an oracle 310, a verifier 312 with a subset of verifiers including a first verifier 314*a*, a second verifier 314*b*, and a third verifier 314*c*, data sources 320*a-n* including a first data source 320*a*, a second data source 320*b*, a third data source 320*c*, a fourth data source 320*d*, and a fifth data source 320*n*, and a historical data store 322, according to an example embodiment.

The notations 1, 2, 3 . . . n; a, b, c, . . . n; "a-n", "a-d", "a-f", "a-g", "a-k", "a-c" and the like illustrate that the number of elements can vary depending on a particular implementation and is not limited to the number of elements being depicted or described. Moreover, these are only examples of various components, and the number and types of components, functions, etc. may vary based on a particular deployment and use case scenario.

The distributed ledger 302 can have the same features and capabilities as the distributed ledger 110 of FIG. 1. The distributed ledger 302 may be associated with the smart contract 304, the first digital wallet 306, and the second digital wallet 308 which communicate with one another via a network which may be described as a blockchain network. Communications within the network may be considered in-band communications. The distributed ledger 302, the smart contract 304, the first digital wallet 306, and the second digital wallet 308 may not be capable of communicating with components, modules, computer programs, and/or devices outside of the in-band network. An oracle 310 may be used by the distributed ledger 302 as a gateway to the rest of the world for obtaining out-of-band data and communications from an out-of-band data source using communication paths from networks other than the in-band network. The embodiments presented herein can be employed to verify data obtained by the oracle 310.

Participants with access to the distributed ledger 302 may interact with the distributed ledger 302. One form of interaction can be accomplished via programmatic means. For example, the smart contract 304 can interact with the distributed ledger 302. The smart contract 304 can be a software construct that operates in an immutable manner. The smart contract 304 may use or rely upon 'signals,' e.g. a data set, from the outside or real world as part of the input used to drive the execution of the smart contract 304.

A wallet, such as the first digital wallet 306 or the second digital wallet 308, may store information including financial transaction information and identification information. The digital wallet can be described as an application or service. A digital wallet is typically associated with a particular user or entity and stores keys, passwords, etc. for that user.

The smart contract 304 may interact with a first data set or a signal from the first data source 320*a* stored on the distributed ledger 302. For example, the first data set can represent real world information such as a real-time stock price. The first data set may be data that is outside of the blockchain network. Therefore, the oracle 310 can be used to obtain the first data set. In one embodiment, all data obtained by the oracle 310 is passed through the verifier 312 before being sent to the distributed ledger 302 and subsequently utilized by the smart contract 304. Thus data from the oracle 310 is not directly sent to the distributed ledger 302. The verifier 312 can be used to verify that the first data set is accurate or trustworthy.

The verifier 312 can generate a confidence level regarding the first data set. The confidence level of the first data set may be employed to determine whether or not the first data set is written to the distributed ledger 302 and subsequently used by the smart contract 304, the first digital wallet 306, or the second digital wallet 308. The oracle 310 and the first data source 320*a* are points that can be compromised and manipulated. Data written to the distributed ledger 302 is immutable and any erroneous data will be persistent. Therefore, the techniques presented herein employ the verifier 312 to ensure trustworthiness or a minimum confidence level before data from the oracle 310 and the first data source 320*a* are written to the distributed ledger 302 and used by the smart contract 304, the first digital wallet 306, or the second digital wallet 308. In one example, a high confidence level, or th1, can be that the first verifier 314*a*, the second verifier 314*b*, and the third verifier 314*c* each concur with data from the oracle 310. A high confidence level can result in the data being written to the distributed ledger 302. In one example, a reduced confidence level, or th2, can be that the first verifier 314*a* and the second verifier 314*b* each concur with data from the oracle 310 but the third verifier 314*c* does not concur. A reduced confidence level can result in the data being written to the distributed ledger 302 along with a flag noting the reduced confidence level. In one example, a low confidence level, or th3, can be that two out of the three verifiers do not concur with data from the oracle 310. A low confidence level can result in the data being discarded and not written to the distributed ledger 302.

The verifier 312 can be described as a verification system that employs a subset of verifiers including the first verifier 314*a*, the second verifier 314*b*, and the third verifier 314*c* where each of the verifiers of the subset of verifiers can communicate with a data source different from the first data source 320*a*. It should be appreciated that any number n of verifiers can be used for the subset of verifiers. For example, the system depicts the first verifier 314*a* obtaining data from the second data source 320*b*, the second verifier 314*b* obtaining data from the third data source 320*c*, and the third verifier 314*c* obtaining data from the fourth data source 320*d*.

The verifier 312 with the subset of verifiers may comprise various components that may be configured to communicate in a cryptographically secure manner, using out-of-band or 'side-channel' communication paths to a set of alternative data sources, such as the second data source 320*b*, the third data source 320*c*, and the fourth data source 320*d*. At least one of the second data source 320*b*, the third data source 320c, and the fourth data source 320d may operate as an out-of-band communication path. In one embodiment, the first data source 320a, the second data source 320b, the third data source 320c, and the fourth data source 320d may provide stock price values. However, one of the second data source 320b, the third data source 320c, and the fourth data source 320d may not be a direct stock price value but instead may be a stock 'index'. An algorithm may then be employed to determine the value of a specific stock price from within the index.

It should be appreciated that the verifier 312 is not limited to the three alternative data sources including the second data source 320b, the third data source 320c, and the fourth data source 320d but can employ any number of alternative data sources. The verifier 312 is also not limited to a subset of three verifiers as depicted. The verifier 312 can also obtain data from any number of data sources including the fifth data source 320n. The fifth data source 320n may be considered a new data source. When the new data source is obtained, a new verifier may be initiated or added to the subset of verifiers and associated with the new data source. The new data source may be determined to not be a proxy of one of the existing data sources such as the second data source 320b, the third data source 320c, and the fourth data source 320d. Such a determination about the new data source can be accomplished via a qualification mechanism that is a mechanism of the verifier 312. After the new data source has been obtained, the verifier 312 can obtain data from the new data source to be used for generating a confidence level about the data from the first data source 320a.

In one embodiment, the type, range, and trustworthiness of the alternative data sources contributes to the confidence that can be achieved in generating a confidence level for the data obtained by the oracle 310 from the first data source 320a. For instance, the second data source 320b and the third data source 320c may represent two independent stock market data providers, while the fourth data source 320d may represent a third independent data provider located in a different geographic region. Moreover, qualification mechanisms may be implemented before onboarding any new data source (n), to attest to the fact that source (n) is not simply proxying data from any of the trusted sources previously onboarded (n-1), (n-2), etc., such as the second data source 320b, the third data source 320c, and the fourth data source 320d.

The second data source 320b, the third data source 320c, and the fourth data source 320d may be a subset of a larger group of data sources that are trusted. In one embodiment, for any data verification, a random subset of data sources may be used. The new data source as described above may be obtained from the larger group of data sources. The purpose of using distributed data sources (e.g., a subset within the larger group of data sources), and the verifier 312 that derives confidence levels or trust scores through algorithmic means, is to increase the complexity of performing a successful attack that may send false data to an oracle. More specifically, when the verifier 312 receives data from the oracle 310, it may obtain data from the alternative data sources including the second data source 320b, the third data source 320c, and the fourth data source 320d. The data from these alternative and trusted sources may be subsequently compared. If the data from the second data source 320b, the third data source 320c, and the fourth data source 320d concurs with the data from the first data source 320a, then the integrity of the data from the first data source 320a may be confirmed. However, if the data from the second data source 320b, the third data source 320c, and the fourth data source 320d do not all agree, then the confidence in the data from the first data source 320a may be degraded and remedial actions may be performed. If the data from the first data source 320a is not trusted then the data from the first data source 320a may not be provided to the distributed ledger 302 and/or the smart contract 304. In one example, remedial action may be that the data from the first data source 320a is discarded and not written to the distributed ledger 302. In another example, remedial action may include resetting a verifier, switching to an alternate data source, disconnecting a data source, or onboarding a new data source. In one example, the confidence level, including indicators of the confidence of a data source from the first verifier 314a, the second verifier 314b, and the third verifier 314c can be recorded in the historical data store 322. A verifier associated with a particular data source that has a low confidence level can be specifically investigated understand the cause of the low confidence level of the particular data source.

It is worth noting that some data sources are more prone to volatility and changes in time than others. For instance, there is a strong likelihood that the price of a given stock symbol or ticker will show variations or "deltas" between different trusted data sources (e.g., even when the signals or samples were obtained within a 100 msec time window). To compensate for such scenarios, verifier 312 may perform calibration activities, to profile acceptable deviations in the data obtained from a set of trusted data sources, such as the second data source 320b, the third data source 320c, and the fourth data source 320d. This may be maintained over time. The verifier 312 may perform the calibration and maintain the acceptable deviations in the data. The calibration may include the following steps:

Compute the standard deviation for observed deltas between the data from different data sources.

Determine a corresponding confidence interval based on the standard deviation obtained.

Identify reported values by the oracle 310 that fall outside the confidence interval.

The standard deviations can be used to build confidence intervals. For instance, approximately 95% of the observed deltas would fall within 2 standards deviations. Hence, the set of values obtained from the second data source 320b, the third data source 320c, and the fourth data source 320d may be compared against the value received at the oracle 310 from the first data source 320a. If the values for the data received at the oracle 310 are within the confidence interval computed by the verifier 312, then the values for the data may be written to the distributed ledger 302 and recorded to the historical data store 322, which may be used for subsequent examination. However, if the values for the data reported by the oracle 310 falls outside the confidence interval, then the values for the data provided by the oracle 310 are disregarded. In such case, no value will be recorded to the distributed ledger 302, and this event may be recorded in the historical data store 322.

In one embodiment, tolerances to deviations may be incorporated into the system. For example, a confidence score that may be less than 100% but higher than a threshold figure may be acceptable in some circumstances. In one example, the threshold may be 65%.

Analysis performed over the records stored in the historical data store 322 allows for the examination of signal history or data history and may act as a technique to determine the trustworthiness or credibility of the first data source 320a provided by the oracle 310, that is, the oracle 310 and the first data source 320a together. The historical data in the historical data store 322 may also be used to train the verifier 312 and adapt over time using reconciliation techniques, algorithms, and methods, such as the ones listed below. For instance, a variety of features such as the type of data being acquired, volatility, latency, and frequency of change may all play a factor in the accuracy of reconciliation. Reconciliation techniques therefore play an important role in ensuring the accuracy and reliability of data provided by the oracle 310 to the distributed ledger 302 and the smart contract 304.

Reconciliation methods and algorithms may include but are not limited to the following algorithms:

1. Threshold reconciliation: This algorithm involves using multiple sources to provide data and reconciling the data by setting a threshold for a maximum allowable deviation between the values. If any source provides a value outside of the threshold, it is excluded from the reconciliation process.

2. Weighted average reconciliation: This algorithm involves assigning weights to each source based on its reliability or reputation, and then calculating a weighted average of the values provided by each source. This can help ensure that the most trustworthy sources have a greater influence on the final reconciled value.

3. Median reconciliation: This algorithm involves calculating the median value of the data provided by multiple sources. This can help filter out any outliers or incorrect values provided by individual sources.

4. Time-weighted average price (TWAP) reconciliation: This algorithm involves calculating the average price of an asset over a specified time period, weighting each price by the amount of time it was held. This is commonly used for reconciling prices of cryptocurrencies or tokens.

5. Machine learning-based reconciliation: This algorithm involves training a machine learning model to reconcile data from different sources. The model can learn from past data to improve its accuracy over time, making it particularly useful for reconciling complex or dynamic data.

The choice of reconciliation algorithm or technique may depend on the specific application of the smart contract 304, the type of data from the first data source 320*a* being reconciled and any behaviors that would impact the values provided within a set of data. Different types of data can include data sets related to temperature, rainfall and 'spot weather data' (e.g. is it sunny now?), geolocation information such as the navigation beacon position information of a ship, and financial information such as a currency pair or stock value ticker. A choice or selection of a reconciliation technique may depend on the type of data. For instance, TWAP reconciliation techniques may be suitable for data regarding prices, while other reconciliation techniques may be used for multi-modal data analysis. For example, multi-modal data analysis may be used to trigger a smart contract based on presence combining factors, such as location and time.

The techniques described herein may also be applied when the discrepancies between the various data sets observed may be caused by factors that are not necessarily rooted in cybersecurity threats. For instance, it is not uncommon to find discrepancies in the values reported by independent sources (e.g., the dividend offered by a certain company as reported by Yahoo Finance vs the same dividend as reported by a broker, such as Charles Schwab). Outdated data entries persisted by the data sources, unresponsive APIs, or other factors may also lead to signals that might incorrectly trigger the smart contract 304.

Figure 4:
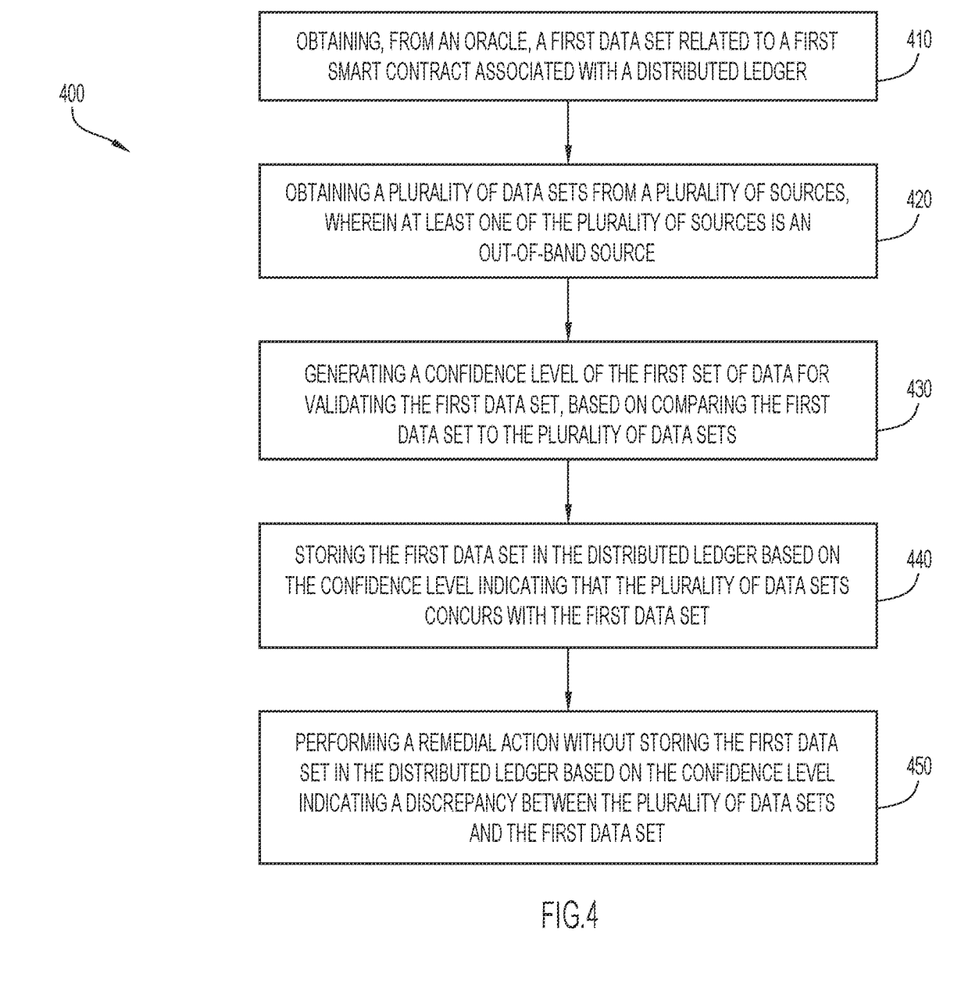
FIG. 4 is a flow chart depicting a method for verifying data, according to an example embodiment.

FIG. 4 illustrates a flow chart for a method 400 for verifying data, according to an example embodiment. The method 400 can be a computer-implemented method or a method associated with a non-transitory computer readable storage medium. This method 400 is applicable to operation of any of the devices, cloud computes, mechanisms, and engines presented herein. The method 400 includes, at step 410, obtaining, from an oracle, a first data set related to a first smart contract associated with a distributed ledger. The method 400 further includes, at step 420, obtaining a plurality of data sets from a plurality of sources, wherein at least one of the plurality of sources is an out-of-band source. The method 400 further includes, at step 430, generating a confidence level of the first data set for validating the first data set, based on comparing the first data set to the plurality of data sets. The method 400 further includes, at step 440, storing the first data set in the distributed ledger based on the confidence level indicating that the plurality of data sets concurs with the first data set. The method 400 further includes, at step 450, performing a remedial action without storing the first data set in the distributed ledger based on the confidence level indicating a discrepancy between the plurality of data sets and the first data set.

In some aspects, the techniques described herein relate to the method 400, further including: observing deltas between the plurality of data sets representing changes in data between the plurality of data sets; computing a standard deviation of the deltas; and determining a confidence interval based on the standard deviation, wherein the confidence level of the first data set is generated based on whether the first data set fall outside of the confidence interval.

In some aspects, the techniques described herein relate to the method 400, further including: randomly selecting the plurality of sources from a pool of sources.

In some aspects, the techniques described herein relate to the method 400, wherein the comparing the first data set to the plurality of data sets includes: reconciling the first data set to the plurality of data sets using a reconciliation algorithm.

In some aspects, the techniques described herein relate to the method 400, wherein the reconciliation algorithm uses a threshold reconciliation, a weighted average reconciliation, a median reconciliation, a time-weighted average price reconciliation, or a machine learning-based reconciliation.

In some aspects, the techniques described herein relate to the method 400, further including: storing information related to the confidence level to a data store that stores a history of confidence levels related to the oracle; and determining a trust score for the oracle based on the information related to the confidence level and the history of confidence levels, wherein the trust score is indicative of a credibility of the oracle.

In some aspects, the techniques described herein relate the method 400, wherein the out-of-band source uses communications paths from one or more of a data network, a cellular network, or a local access network that is different from a network associated with the first smart contract and the distributed ledger.

In some aspects, the techniques described herein relate to the method 400, further including: determining that a new source is not a proxy source of one of the plurality of sources via a qualification mechanism; adding the new source to the plurality of sources; and obtaining a new data set from the new source for generating the confidence level.

In some aspects, the techniques described herein relate to one or more non-transitory computer readable storage media encoded with software including computer executable instructions that, when executed by a processor, cause the processor to perform a method, including: obtaining, from an oracle, a first data set related to a first smart contract associated with a distributed ledger; obtaining a plurality of data sets from a plurality of sources, wherein at least one of the plurality of sources is an out-of-band source; generating a confidence level regarding the first data set for validating the first data set, based on comparing the first data set to the plurality of data sets; storing the first data set in the distributed ledger based on the confidence level indicating that the plurality of data sets concurs with the first data set; and taking a remedial action without storing the first data set in the distributed ledger based on the confidence level indicating a discrepancy between the plurality of data sets and the first data set.

In some aspects, the techniques described herein relate to a non-transitory computer readable storage media, further including: observing deltas between the plurality of data sets representing changes in data between the plurality of data sets; computing a standard deviation of the deltas; and determining a confidence interval based on the standard deviation, wherein the confidence level of the first data set is generated based on whether the first data set fall outside of the confidence interval.

In some aspects, the techniques described herein relate to a non-transitory computer readable storage media, further including: randomly selecting the plurality of sources from a pool of sources.

In some aspects, the techniques described herein relate to a non-transitory computer readable storage media, wherein the comparing the first data set to the plurality of data sets includes: reconciling the first data set to the plurality of data sets using a reconciliation algorithm.

In some aspects, the techniques described herein relate to a non-transitory computer readable storage media, wherein the reconciliation algorithm uses a threshold reconciliation, a weighted average reconciliation, a median reconciliation, a time-weighted average price reconciliation, or a machine learning-based reconciliation.

In some aspects, the techniques described herein relate to a non-transitory computer readable storage media, further including: storing information related to the confidence level to a data store that stores a history of confidence levels related to the oracle; and determining a trust score for the oracle based on the information related to the confidence level and the history of confidence levels, wherein the trust score is indicative of a credibility of the oracle.

In some aspects, the techniques described herein relate to a non-transitory computer readable storage media, wherein the out-of-band source uses communications paths from one or more of a data network, a cellular network, or a local access network that is different from a network associated with the first smart contract and the distributed ledger.

In some aspects, the techniques described herein relate to a non-transitory computer readable storage media, further including: determining that a new source is not a proxy source of one of the plurality of sources via a qualification mechanism; adding the new source to the plurality of sources; and obtaining a new data set from the new source for generating the confidence level.

In some aspects, the techniques described herein relate to an apparatus, including: a memory; a network interface configured to enable network communications; and a processor, wherein the processor is configured to perform a method including: obtaining, from an oracle, a first data set related to a first smart contract associated with a distributed ledger; obtaining a plurality of data sets from a plurality of sources, wherein at least one of the plurality of sources is an out-of-band source; generating a confidence level regarding the first data set for validating the first data set, based on comparing the first data set to the plurality of data sets; storing the first data set in the distributed ledger based on the confidence level indicating that the plurality of data sets concurs with the first data set; and taking a remedial action without storing the first data set in the distributed ledger based on the confidence level indicating a discrepancy between the plurality of data sets and the first data set.

In some aspects, the techniques described herein relate to an apparatus, further including: observing deltas between the plurality of data sets representing changes in data between the plurality of data sets; computing a standard deviation of the deltas; and determining a confidence interval based on the standard deviation, wherein the confidence level of the first data set is generated based on whether the first data set fall outside of the confidence interval.

In some aspects, the techniques described herein relate to an apparatus, wherein the comparing the first data set to the plurality of data sets includes: reconciling the first data set to the plurality of data sets using a reconciliation algorithm.

In some aspects, the techniques described herein relate to an apparatus, wherein the reconciliation algorithm uses a threshold reconciliation, a weighted average reconciliation, a median reconciliation, a time-weighted average price reconciliation, or a machine learning-based reconciliation.

Figure 5:
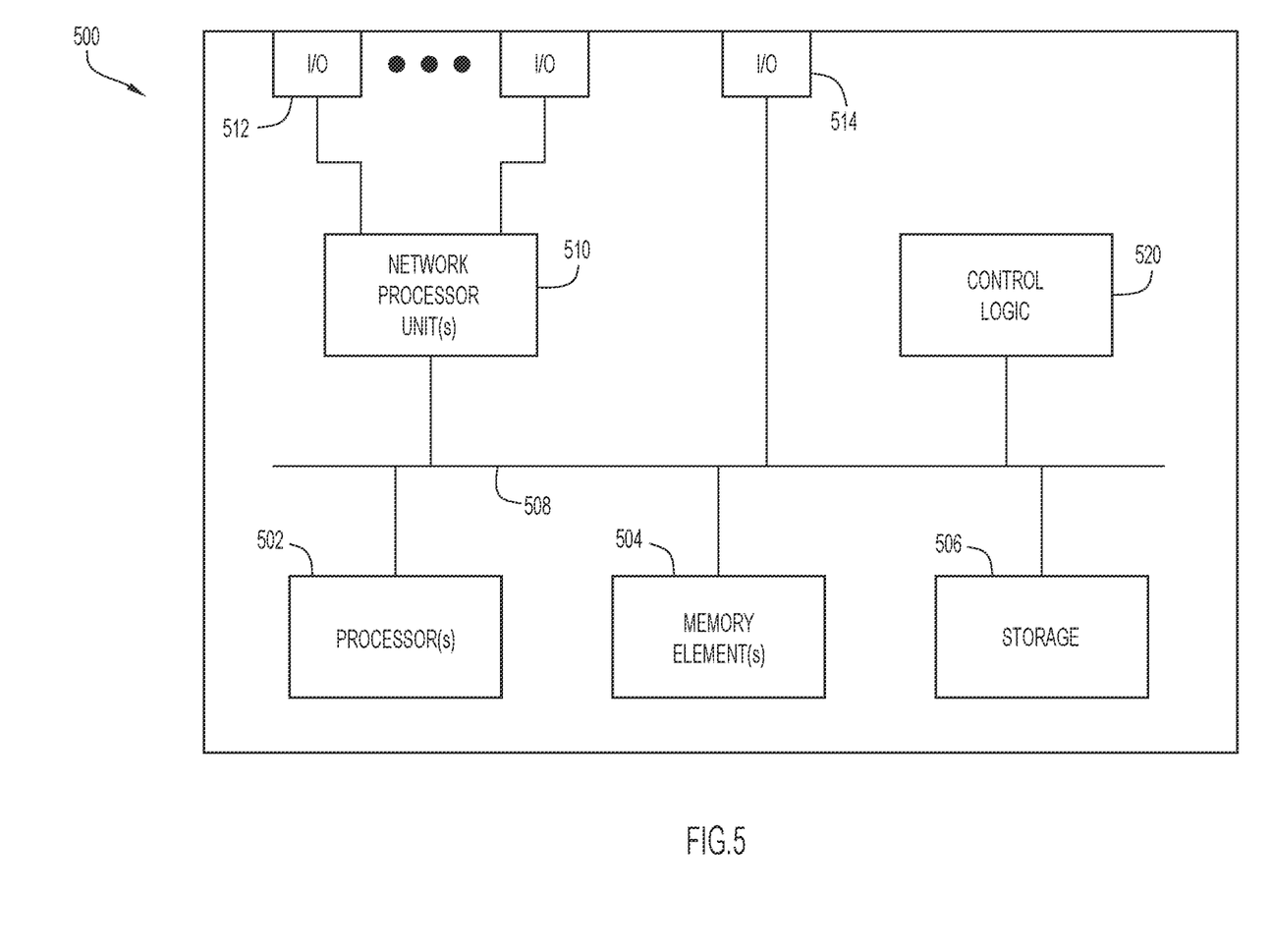
FIG. 5 is a block diagram of a computing or networking apparatus, according to an example embodiment.

FIG. 5 illustrates a hardware block diagram of a device 500 that may perform functions associated with operations discussed herein in connection with the techniques depicted in FIGS. 1-3. For example, the device 500 can be the infrastructure 112 of FIG. 1 as well as the components of the system 300 of FIG. 3.

In at least one embodiment, the device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for device 500 can overlap in any manner and are not limited to the specific allocation of instructions and/or operations described herein.

In at least one embodiment, processor(s) 502 is/are at least one hardware processor configured to execute various tasks, operations and/or functions for device 500 as described herein according to software and/or instructions configured for device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as data store systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, data stores, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In another example embodiment, one or more non-transitory computer readable storage media encoded with instructions are provided. When the media is executed by a processor, the instructions cause the processor to execute a method that includes obtaining, by a digital twin, a first data set from a first smart contract that stores the first data to a first distributed ledger and a second data set from a second smart contract that stores the second data set to a second distributed ledger. The method further includes determining operating states of the first and second smart contracts based on the first data set, the second data set, and one or more state messages from an oracle associated with the first distributed ledger and the second distributed ledger. The method further includes generating a consolidated view of the first and second smart contracts, based on the operating states. The method further includes providing the consolidated view of the first and second smart contracts for monitoring the operating states and interactions between the first and second smart contracts as a whole.

In yet another example embodiment, an apparatus is provided. The apparatus includes a memory, a network interface configured to enable network communications, and a processor. The processor is configured to perform a method including obtaining, by a digital twin, a first data set from a first smart contract that stores the first data to a first distributed ledger and a second data set from a second smart contract that stores the second data set to a second distributed ledger. The method further includes determining operating states of the first and second smart contracts based on the first data set, the second data set, and one or more state messages from an oracle associated with the first distributed ledger and the second distributed ledger. The method further includes generating a consolidated view of the first and second smart contracts, based on the operating states. The method further includes providing the consolidated view of the first and second smart contracts for monitoring the operating states and interactions between the first and second smart contracts as a whole.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any data store, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other data stores, data stores or storage structures (e.g., files, data stores, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    obtaining, from an oracle, a first data set related to a first smart contract associated with a distributed ledger;
    obtaining a plurality of data sets from a plurality of sources, wherein at least one of the plurality of sources is an out-of-band source;
    generating a confidence level of the first data set for validating the first data set, based on comparing the first data set to the plurality of data sets;
    storing the first data set in the distributed ledger based on the confidence level indicating that the plurality of data sets concurs with the first data set;
    performing a remedial action without storing the first data set in the distributed ledger based on the confidence level indicating a discrepancy between the plurality of data sets and the first data set;
    storing information related to the confidence level to a data store that stores a history of confidence levels related to the oracle; and
    determining a trust score for the oracle based on the information related to the confidence level and the history of confidence levels, wherein the trust score is indicative of a credibility of the oracle.

2. The computer-implemented method of claim 1, further comprising:
    observing deltas between the plurality of data sets representing changes in data between the plurality of data sets;
    computing a standard deviation of the deltas; and
    determining a confidence interval based on the standard deviation,
    wherein the confidence level of the first data set is generated based on whether the first data set fall outside of the confidence interval.

3. The computer-implemented method of claim 1, further comprising:
    randomly selecting the plurality of sources from a pool of sources.

4. The computer-implemented method of claim 1, wherein comparing the first data set to the plurality of data sets comprises:
    reconciling the first data set to the plurality of data sets using a reconciliation algorithm.

5. The computer-implemented method of claim 4, wherein the reconciliation algorithm uses a threshold reconciliation, a weighted average reconciliation, a median reconciliation, a time-weighted average price reconciliation, or a machine learning-based reconciliation.

6. The computer-implemented method of claim 1, wherein the out-of-band source uses communications paths from one or more of a data network, a cellular network, or a local access network that is different from a network associated with the first smart contract and the distributed ledger.

7. The computer-implemented method of claim 1, further comprising:
    determining that a new source is not a proxy source of one of the plurality of sources via a qualification mechanism;
    adding the new source to the plurality of sources; and
    obtaining a new data set from the new source for generating the confidence level.

8. One or more non-transitory computer readable storage media encoded with software comprising computer executable instructions that, when executed by a processor, cause the processor to perform a method, comprising:
    obtaining, from an oracle, a first data set related to a first smart contract associated with a distributed ledger;
    obtaining a plurality of data sets from a plurality of sources, wherein at least one of the plurality of sources is an out-of-band source;
    generating a confidence level of the first data set for validating the first data set, based on comparing the first data set to the plurality of data sets;
    storing the first data set in the distributed ledger based on the confidence level indicating that the plurality of data sets concurs with the first data set;
    performing a remedial action without storing the first data set in the distributed ledger based on the confidence level indicating a discrepancy between the plurality of data sets and the first data set,
observing deltas between the plurality of data sets representing changes in data between the plurality of data sets;
computing a standard deviation of the deltas; and
determining a confidence interval based on the standard deviation, wherein the confidence level of the first data set is generated based on whether the first data set fall outside of the confidence interval.

9. The one or more non-transitory computer readable storage media of claim 8, further comprising:
randomly selecting the plurality of sources from a pool of sources.

10. The one or more non-transitory computer readable storage media of claim 8, wherein comparing the first data set to the plurality of data sets comprises:
reconciling the first data set to the plurality of data sets using a reconciliation algorithm.

11. The one or more non-transitory computer readable storage media of claim 10, wherein the reconciliation algorithm uses a threshold reconciliation, a weighted average reconciliation, a median reconciliation, a time-weighted average price reconciliation, or a machine learning-based reconciliation.

12. The one or more non-transitory computer readable storage media of claim 8, further comprising:
storing information related to the confidence level to a data store that stores a history of confidence levels related to the oracle; and
determining a trust score for the oracle based on the information related to the confidence level and the history of confidence levels, wherein the trust score is indicative of a credibility of the oracle.

13. The one or more non-transitory computer readable storage media of claim 8, wherein the out-of-band source uses communications paths from one or more of a data network, a cellular network, or a local access network that is different from a network associated with the first smart contract and the distributed ledger.

14. The one or more non-transitory computer readable storage media of claim 8, further comprising:
determining that a new source is not a proxy source of one of the plurality of sources via a qualification mechanism;
adding the new source to the plurality of sources; and
obtaining a new data set from the new source for generating the confidence level.

15. An apparatus comprising:
a memory;
a network interface configured to enable network communications; and
a processor, wherein the processor is configured to perform a method comprising:
obtaining, from an oracle, a first data set related to a first smart contract associated with a distributed ledger;
obtaining a plurality of data sets from a plurality of sources, wherein at least one of the plurality of sources is an out-of-band source;
generating a confidence level of the first data set for validating the first data set, based on comparing the first data set to the plurality of data sets;
storing the first data set in the distributed ledger based on the confidence level indicating that the plurality of data sets concurs with the first data set;
performing a remedial action without storing the first data set in the distributed ledger based on the confidence level indicating a discrepancy between the plurality of data sets and the first data set;
storing information related to the confidence level to a data store that stores a history of confidence levels related to the oracle; and
determining a trust score for the oracle based on the information related to the confidence level and the history of confidence levels, wherein the trust score is indicative of a credibility of the oracle.

16. The apparatus of claim 15, wherein the processor is further configured to perform:
observing deltas between the plurality of data sets representing changes in data between the plurality of data sets;
computing a standard deviation of the deltas; and
determining a confidence interval based on the standard deviation,
wherein the confidence level of the first data set is generated based on whether the first data set fall outside of the confidence interval.

17. The apparatus of claim 15, wherein comparing the first data set to the plurality of data sets comprises:
reconciling the first data set to the plurality of data sets using a reconciliation algorithm.

18. The apparatus of claim 17, wherein the reconciliation algorithm uses a threshold reconciliation, a weighted average reconciliation, a median reconciliation, a time-weighted average price reconciliation, or a machine learning-based reconciliation.

19. The apparatus of claim 15, wherein the processor is further configured to perform:
randomly selecting the plurality of sources from a pool of sources.

20. The apparatus of claim 15, wherein the out-of-band source uses communications paths from one or more of a data network, a cellular network, or a local access network that is different from a network associated with the first smart contract and the distributed ledger.

\* \* \* \* \*

UNITED STATES PATENT AND TRADEMARK OFFICE
CERTIFICATE OF CORRECTION

PATENT NO. : 12,210,513 B1
APPLICATION NO. : 18/360051
DATED : January 28, 2025
INVENTOR(S) : Joel A. Obstfeld et al.

It is certified that error appears in the above-identified patent and that said Letters Patent is hereby corrected as shown below:

In the Claims

Claim 8, Column 21, Line 2, please replace "data set," with --data set;--

Signed and Sealed this
First Day of April, 2025

Coke Morgan Stewart
*Acting Director of the United States Patent and Trademark Office*